United States Patent
Rhodes et al.

(10) Patent No.: US 8,716,902 B2
(45) Date of Patent: May 6, 2014

(54) INDUCTIVELY COUPLED DATA AND POWER TRANSFER SYSTEM AND APPARATUS

(75) Inventors: Mark Rhodes, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

(21) Appl. No.: 13/602,405

(22) Filed: Sep. 4, 2012

(65) Prior Publication Data

US 2012/0326526 A1    Dec. 27, 2012

Related U.S. Application Data

(62) Division of application No. 12/643,527, filed on Dec. 21, 2009, now abandoned.

(30) Foreign Application Priority Data

Dec. 23, 2008 (GB) .................................. 0823436.1

(51) Int. Cl.
| | | |
|---|---|---|
| H01F 27/42 | (2006.01) | |
| H01F 37/00 | (2006.01) | |
| H01F 38/00 | (2006.01) | |
| H04B 1/38 | (2006.01) | |

(52) U.S. Cl.
CPC . *H01F 27/42* (2013.01); *H04B 1/38* (2013.01)
USPC .............................. 307/104; 307/17; 320/108

(58) Field of Classification Search
USPC .......................................... 107/104; 307/104
See application file for complete search history.

(56) References Cited

U.S. PATENT DOCUMENTS

| | | | | |
|---|---|---|---|---|
| 4,124,990 A | * | 11/1978 | Bell et al. ....................... | 405/167 |
| 6,343,494 B2 | * | 2/2002 | Roos et al. ...................... | 70/264 |
| 6,986,320 B2 | * | 1/2006 | Shelton et al. ................ | 114/312 |
| 7,176,589 B2 | * | 2/2007 | Rouquette ....................... | 307/17 |
| 7,462,951 B1 | | 12/2008 | Baarman ........................ | 307/9.1 |
| 2005/0185349 A1 | * | 8/2005 | Biester et al. .................... | 361/18 |

(Continued)

FOREIGN PATENT DOCUMENTS

| | | | | |
|---|---|---|---|---|
| GB | 2464972 | * | 5/2010 | |
| WO | 2006/134331 | | 12/2006 | ............. H04B 13/02 |
| WO | 2008/137996 | | 11/2008 | ............. H01F 38/14 |

OTHER PUBLICATIONS http://www.geoexpro.com/sfiles/8/21/6/file/Valhall_26-29.pdf Halfan Carstens Breakthrough for repeated seismic . . . .

*Primary Examiner* — Stephen W Jackson
*Assistant Examiner* — Toan Vu
(74) *Attorney, Agent, or Firm* — Paul Davis; Mintz Levin (57) ABSTRACT

The present invention provides a system and apparatus for transferring electronic data and/or power from one station to another by means of a transportable pod comprising a solid state memory device and further provided with an inductively linked, electrically insulated connector. The transportable pod comprises a battery which is used to power a remote host docking station, which may be used in an underwater environment for the collection of subsea data. The transportable pod can be transferred alternately from a home docking station, where it is charged up, and where it's stored data is uploaded and to a remote host docking station where is provides power, and where it collects and stores data collected by the remote host docking station.

11 Claims, 6 Drawing Sheets

(56) References Cited

U.S. PATENT DOCUMENTS

| | | | |
|---|---|---|---|
| 2006/0159158 A1 | 7/2006 | Moore et al. | 375/130 |
| 2007/0035917 A1 | 2/2007 | Hotelling et al. | 361/683 |
| 2008/0035376 A1* | 2/2008 | Freyer | 175/45 |
| 2008/0108245 A1 | 5/2008 | Chu et al. | 439/374 |

* cited by examiner

INDUCTIVELY COUPLED DATA AND POWER TRANSFER SYSTEM AND APPARATUS

CROSS-REFERENCE TO RELATED APPLICATIONS

This application is a divisional of U.S. application Ser. No. 12/643,527 filed Dec. 21, 2009, now abandoned which claims the benefit of GB 0823436.1 filed Dec. 23, 2008, which applications are fully incorporated herein by reference.

FIELD OF USE

The present invention relates to a system for transferring electronic data and/or power from one station to another by means of a transportable unit provided with a solid state memory device a portable energy source and an inductively coupled, electrically insulated connector.

BACKGROUND TO THE INVENTION

Universal Serial Bus (USB) "memory sticks" have become an extremely convenient and practical method of transferring electronic data between computer systems. Recently the capacity supported by these small transportable devices has increased to many tens of Gigabytes and no doubt will continue to expand further over time. These devices typically consist of a USB interface device which supports several NAND flash memory integrated circuits. Power is supplied over the USB standard connector which also supports the two wire high speed serial data interface. Several inventions have sort to devise mechanical protection mechanisms for the USB connector. For example United States Patent Application Publication 2008/108245A1 "Protection mechanism for terminal of memory stick adapter" Shu-Chin, describes a retracting cover for the terminals of a memory stick device. The mechanism taught by Shu-chin provides a means to minimize mechanical damage of the connector contacts.

Contamination of the electrically conductive terminals is another failure mechanism of the USB memory stick connector. The connector relies on metal to metal conductive contact and this can fail due to contamination with insulating material, which prevents conductive contact, or contamination with conductive material, which can introduce a short circuit between adjacent pins.

There is a need for a solid state portable memory device integrated with an electrically insulated connector system that overcomes these limitations.

Electrical connections are a challenging aspect of underwater electrical system design; the standard implementation of an electrical connector includes terminals or pins which make conductive electrical contact with each other. Such terminals and pins are subject to corrosion and contamination; corrosion of the terminals produces poor or intermittent contact and failure of the connector. Furthermore, in under water applications, water must be excluded from the conductive contacts to prevent short circuits due to the partially conductive nature of water. Thus, wet mating connections present even greater challenges to overcome since water must be expelled from the conductive contacts during mating and since care must be taken to ensure an electrical signal is not applied to the connector while the contacts are exposed to the water and before the connection is made. A connector which does not rely upon direct conductive contact would avoid these problems.

Additionally, any multi pin connector must be rotationally aligned to ensure registration of the intended cross connections. This requirement can be problematic in underwater applications, particularly where the connection point is not readily accessible by an operator such as when a connection is established by an autonomous system deep in the ocean. Slip ring connectors have been designed to avoid this issue but typically employ conductive contacts which are subject to corrosion and contamination as described herein. An electrically insulated data and power connection which mates independent of angular alignment would be beneficial in many underwater applications.

In the field of oil and gas exploration, seismic imaging over a large area of the seabed is an important method for optimization of oil and gas production, and for the assessment of the capacity of a particular field. The article entitled "Breakthrough for repeated seismic" by Halfdan Carstens, Geo ExPro; September 2004; pp 26-29, http://www.geoexpro.com/sfiles/8/21/6/file/Valhall_26-29.pdf outlines a system for the gathering of seismic imaging data over a large area of the seabed.

The system for undersea seismic imaging taught by Carstens comprises a network or array of seismic monitoring stations which include sensors—such as geophones and hydrophones located at evenly spaced intervals (typically 50 meters) spanning a given area around a field of underwater exploration. The seismic monitoring stations taught be Carstens are linked together by a wired network of cable, and the data collected from the seismic sensors is gathered and stored by a main processing unit which is connected into the wired network; the wired network of cable also provides a means for the synchronization of the various sensors in the network.

Typically the seismic sensors and seismic monitoring stations record data at regular time intervals. Over the duration of one 'survey' the data collected per station could be in the order of one Gigabyte. The transfer of one Gigabyte of data in a reasonable length of time produces a requirement of the wired network for a data rate which is in the order of hundreds of kilobits per second.

The benefits of rolling out such a wired seismic motoring network are optimization of oil and gas production, the generation of information on the optimum drilling locations and the generation of information on field capacity and yield. The drawbacks of installing such a wired seismic motoring network are the cost of network deployment and the cost of maintenance thereof. It would be preferable to deploy a network of isolated, free-standing seismic monitoring stations, where power and data transfer are provided by some alternative means to a wired network.

SUMMARY OF THE INVENTION

According to one aspect of the present invention, there is provided a system for transferring electronic data from a first station to a second station by means of a transportable pod comprising a solid state memory device and an inductively coupled, electrically insulated connector.

According to another aspect of the present invention, there is provided a system for transferring electrical power through the inductively coupled connector from a battery provided within the transportable pod between the first and second stations.

According to another aspect of the present invention, there is provided a transportable pod comprising a battery, a solid state memory device, each of which is electrically coupled to an inductively coupled connector of the transportable pod via control electronic circuitry. During use, electrical power is transferred between the battery of the pod and an external docking station via the inductively coupled connector of the pod. Furthermore, during use, data is transferred between the solid state memory device of the pod and an external docking station via the same inductively coupled connector.

The solid state memory device of the transportable pod may be implemented using a flash memory device; hard disk device or alternative means of electronic storage.

The transportable pod of the present invention is particularly suited to applications where the remote host docking station is located underwater.

In some embodiments the control electronic circuitry coupling the battery to the inductively coupled connector of the transportable pod is a power transfer sub-system comprising an AC/DC converter or a DC/AC converter.

In other embodiments the control electronic circuitry coupling the memory device of the transportable pod to the inductively coupled connector is a data interface comprising a high pass filter and a modem operable to decode a data stream received from the external docking station or to encode a data stream to be transferred to docking station.

In one embodiment, there is provided a release mechanism that is activated remotely to initiate de-mating of the transportable pod from the remote host docking station. Remote activation may be via radio communications. For embodiments where the remote host docking station is located underwater, remote activation may be via acoustic subsea communications, or subsea radio communications.

According to another embodiment of the present invention, the transportable pod comprising a solid state memory device and a battery is arranged to be positively buoyant when immersed in water. Thus, for example, when the remote release de-mates the transportable pod from an underwater remote host docking station the transportable pod will float to the surface of the water to allow recovery of the transportable pod from the surface of the water.

In some applications, the transportable pod will remain tethered to the host system as it floats to the surface of the water to ensure it remains close to the expected recovery point. The transportable pod may be provided with a spooled line that is attached to the remote host system and which is deployed as the pod rises to the surface.

In another embodiment of the present invention, there is provided a means for providing the transportable pod with positive buoyancy in response to a remote release signal. This may be implemented using a compressed gas canister which inflates a bladder contained in or attached to the outside of the transportable pod to create positive buoyancy.

In some embodiments, the docking station forms part of a remote host system comprising an inductively coupled connector that can mate to the inductively coupled connector of the transportable pod thereby providing a means for transferring electrical power from the pod battery to the host docking station via the inductive connectors of the pod and the host station, and also providing means for transferring data from the host station to the transportable pod and/or data from the transportable pod to the host station.

In other embodiments of the present invention, there is provided a docking station that forms part of a home station comprising an inductively coupled connector that can mate to the inductively coupled connector of the transportable pod thereby providing means for transferring charge to the pod battery, and for transferring data to and from the pod memory device.

The system of the present invention typically has applications where an electrically conductive contact based connector system would be exposed to contaminants.

Applications of the present invention include any harsh environment, and the inductively coupled data and power transfer systems and apparatus described herein are particularly suited to underwater applications.

In another embodiment of the present invention, there is provided a mechanical retention mechanism and mechanical release mechanism for the transportable pod.

According to another embodiment of the present invention, there is provided a remote host docking station comprising multiple inductively coupled connectors each of which are pre-loaded with transportable pods, and system control circuitry which can detach a spent pod after its deployment period and which can switch to a fresh pod for data and power transfer to allow data collection without the need for a system to replace memory pods.

In one embodiment the home docking station and host docking station may be further provided with Universal Serial Bus (USB) interfaces.

Embodiments of the present invention will now be described with reference to the accompanying figures in which.

BRIEF DESCRIPTION OF DRAWINGS

DETAILED DESCRIPTION

Figure 1:
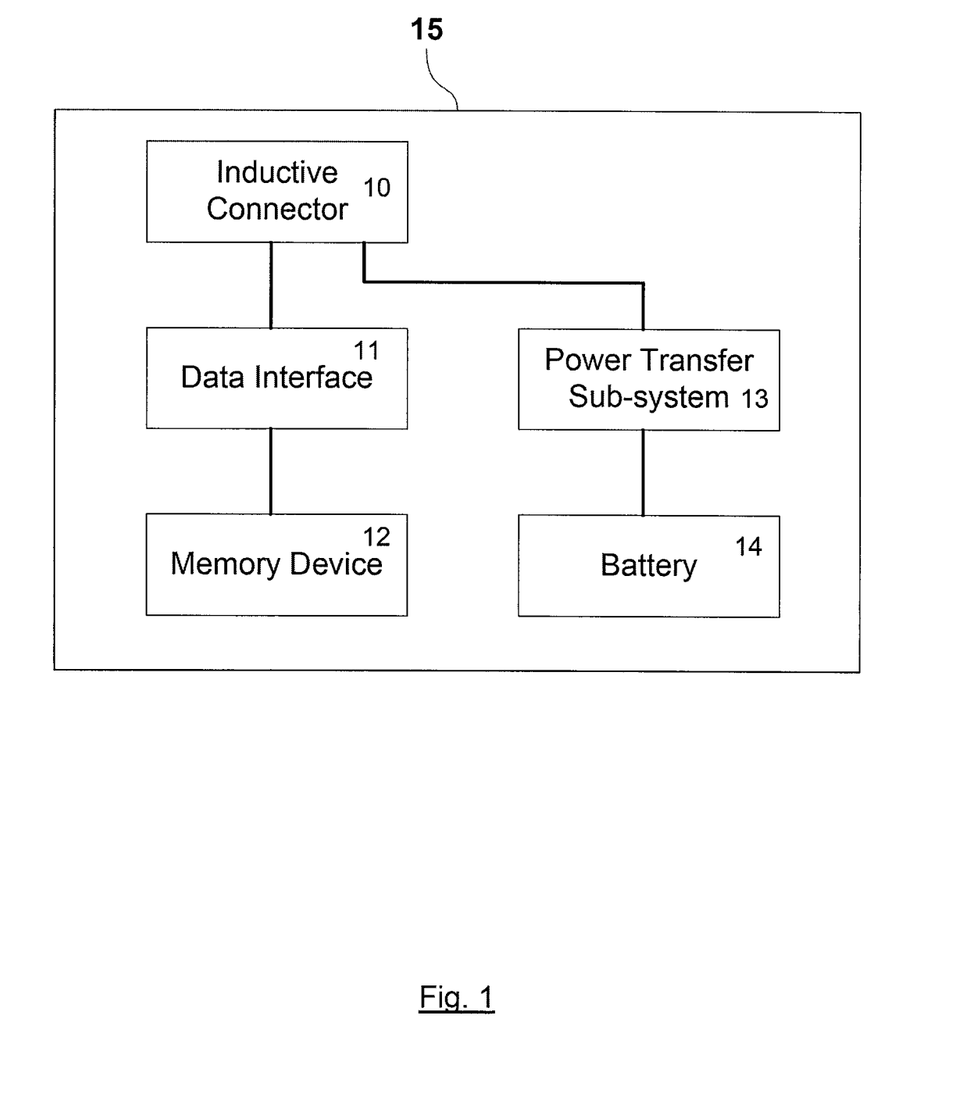
FIG. 1 shows a functional block diagram of the electronic circuitry of a transportable pod according to an embodiment of the present invention.

FIG. 1 is a functional block diagram of a transportable pod according to an embodiment of the present invention. Block 10 represents the inductively coupled connector which is shown in further detail in FIG. 3. Data interface 11 processes a modulated signal which is received from an external docking station (not shown) via inductively coupled connector 10 and formats the data for presentation at the input of memory device 12. Similarly, data interface 11 can read stored data in memory device 13 and modulate the data for transfer to an external docking station (not shown) via inductively coupled connector 10 so as to provide bi directional data exchange between the external docking station (not shown) and memory device 12 of the transportable pod of the present invention. Data interface 11 might include such electronic circuitry as a modem to modulate data from memory device 12 for transfer over inductive connector 10 and to de-modulate data received via inductive connector 10 for interfacing with memory device 12. Power transfer sub-system 13 couples battery 14 to inductive connector 10 of the transportable pod and comprises electronic circuitry for coupling AC electrical power received at inductive connector 10 to battery 1 such circuitry might include an AC/DC converter; power transfer sub-system 13 similarly comprises electronic circuitry for coupling DC power from battery 14 to AC electrical power at inductive connector 10, such circuitry might include a DC/AC converter.

Figure 2:
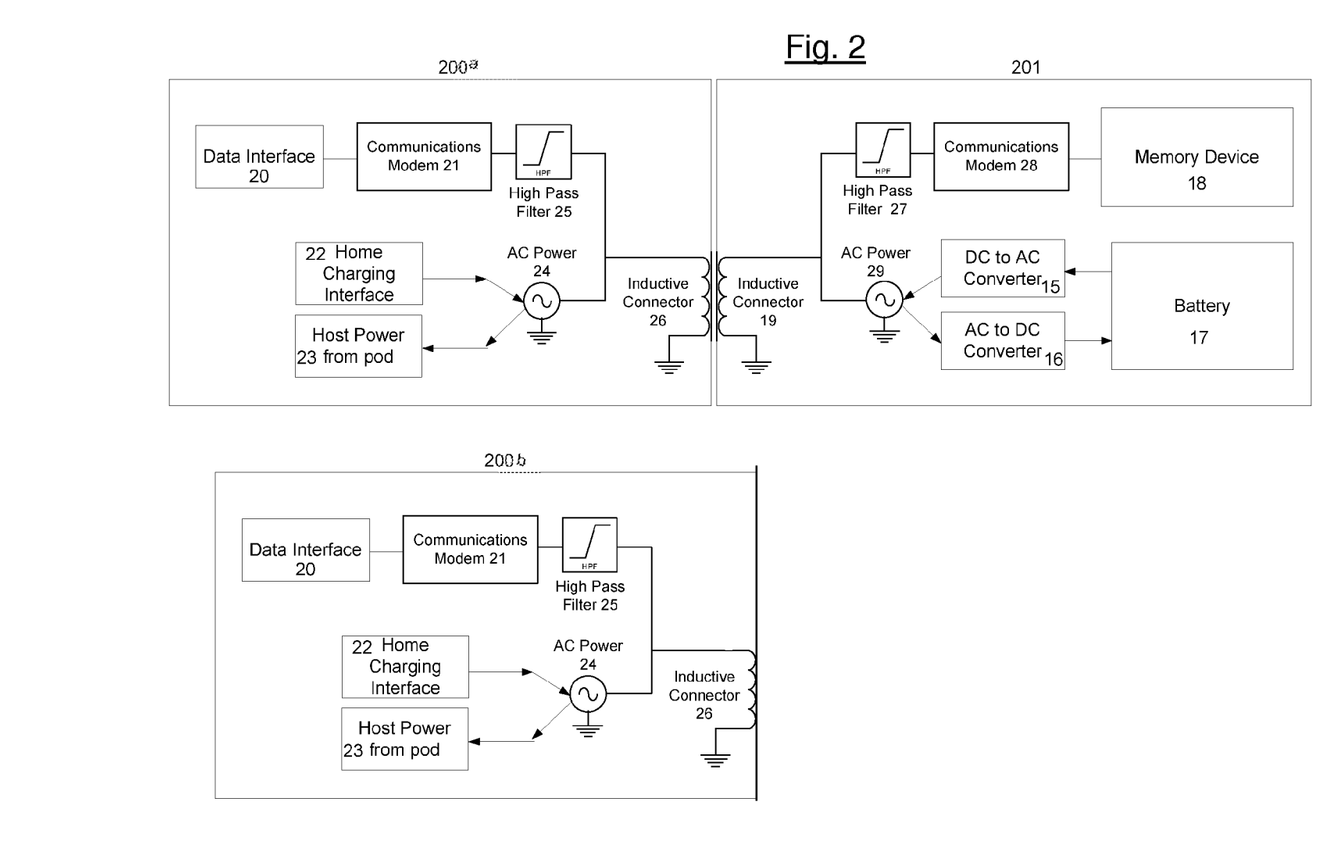
FIG. 2 shows a block diagram of an inductively coupled data and power transfer system according to an embodiment of the present invention.

FIG. 2 shows a block diagram of an inductively coupled data and power transfer system according to an embodiment of the present invention. The inductively coupled data and power transfer system comprises transportable pod 201 which is mated with docking station 200. Docking station 200 may be a remote host docking station 200b—for example located underwater and comprising one or more sensors for data collection; alternatively, docking station may be a home station 200a—for example located on a base station. Transportable pod 201 comprises memory device 18, battery 17 and inductively coupled connector 19. During use, inductive connector 19 transfers power and data between docking station 200 and memory device 18 of transportable pod 201. AC to DC converter 16 is used to provide DC power to battery 17 for charging. On the other hand DC to AC converter 15 is used to convert DC from battery 17 to AC for coupling to docking station 200 via inductive connector 19. High pass filter 27 separates the power transfer signal from a modulated carrier signal that sends and received data via inductive connector 19. Communications modem 28 modulates data received from memory device 18 for transfer over inductive connector 19 and de-modulates data received via inductive connector 19 for interfacing with memory device 18.

Docking station 200 comprises data interface 20 and communications modem 21 connected to inductive connector 26 via high pass filter 25 and further comprises home charging interface 22 and/or host power interface 23. For systems in applications where docking station 200 is a remote host station 200b, home charging interface is typically omitted. Similarly for systems where docking station 200 is a home station 200a host power interface 23 is typically omitted. High pass filter 25 separates the power transfer signal from a modulated carrier signal that sends and received data via inductive connector 26. Home charging interface comprises a DC to AC converter to convert DC power which it receives at an input of home docking station 200a to AC power for coupling to transportable pod 201 via inductive connectors 26 and 19. The power coupled to transportable pod 201 via inductive connectors 26 and 19 is used to charge battery 17 of transportable pod 201. Host charging interface comprises an AC to DC converter to convert AC power received from transportable pod 201 via inductive connectors 19 and 26 and to provide DC power to remote host docking station 200b. DC power provided to remote host docking station 200b from transportable pod 201 via inductive connectors 19 and 26 can be used to power communications modem 21, data interface 20 and any sensors or other data collection devices which are connected to docking station 200. Data collected by remote host docking station 200b is transferred to memory device 18 of transportable pod 201 via communications modem 21, high pass filter 25, inductive connectors 26 and 19, high pass filter 27, and communications modem 28.

The transportable pod of the present invention depicted in FIG. 1 and the inductively coupled data and power transfer system of the present invention depicted in FIG. 2 is particularly suitable for the transfer of data and electrical power between a home docking station 200a and a remote host docking station 200b via a transportable pod where the remote host docking station is located underwater.

In an example usage case, a transportable pod is provided with a solid state memory device, a battery supply and an inductive connector system. An unmanned underwater vehicle (UUV) transports the transportable pod to a remotely deployed sensor (RDS) unit on the seabed. The RDS has been deployed for a period of time, it draws its power from the battery within the transportable pod and stores recorded data within the solid state memory device of the transportable pod. The UUV detaches a previously deployed first transportable pod from the RDS by transmitting a short range underwater radio signal to initiate release of the pod. The UUV recovers the first transportable pod and replaces it with a second unit which it has brought from the surface of the sea. The first unit is recovered for analysis of recorded data. The second unit has a fully charged battery which provides power to the RDS for the next deployment period. The RDS continues to record data on the memory device of the second transportable pod.

In another system application the transportable pod and host docking station form part of a system for recovering data and/or delivering power to a remotely deployed subsea seismic sensor or array of sensors. Sensors may be spaced at known intervals along a subsea cable that is arranged to carry data and power from each sensor to a host docking station. A transportable pod mated with the docking station provides power for the connected sensor array and stores recorded data from the sensors. The transportable pod can be exchanged periodically as described above.

Figure 3:
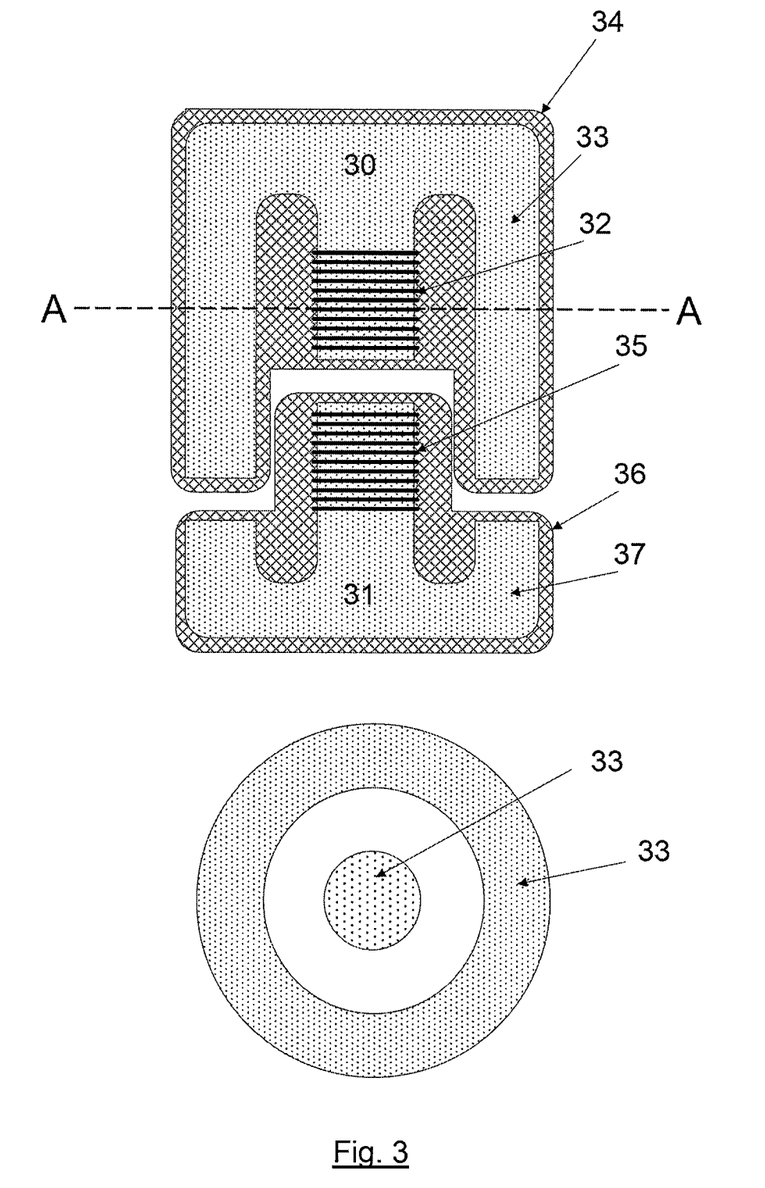
FIG. 3 shows the mechanical construction of a female inductive connector 30 and a male inductive connector 31 for use in the embodiment of the present invention depicted in FIG. 2.

FIG. 3 shows the mechanical construction of the inductively coupled connectors 19 and 26 of FIG. 2. Inductively coupled connector 19 of FIG. 2 is represented by male inductive connector 31 of FIG. 3 and inductively coupled connector 26 of FIG. 2 is represented by female inductive connector 30 of FIG. 3. The upper section of FIG. 3 shows a cross section side view of both female connector 30 and male connector 31. The lower section of FIG. 3 shows a cross section bottom view of female connector 30. Line A-A indicates the position of the cross section shown in the lower part of FIG. 3. Female inductive connector 30 comprises a coil of wire 32 wound on a core 33 formed of a material having a high magnetic permeability. A material having a relative permeability greater than 10 would be suitable for this application. The entire female connector 30 is encased in a housing 34 formed of an electrically insulating material. Male inductive connector 31 comprises a coil of wire 35 wound on a core 37 formed of a material having a high magnetic permeability. A relative permeability greater than 10 would be suitable for this application. The entire male connector 31 is encased in a housing 36 formed of an electrically insulating material. Male connector 31 and female connector 30 are designed so that the mechanical interface presented by one is the inverse of the other, so that the two connectors fit together snugly. When female connector 30 is mated with male connector 31, magnetic cores 33 and 37 are aligned so that the coil 32 of female inductive connector 30 and the coil 35 of male inductive connector 31 are strongly inductively coupled.

Figure 4:
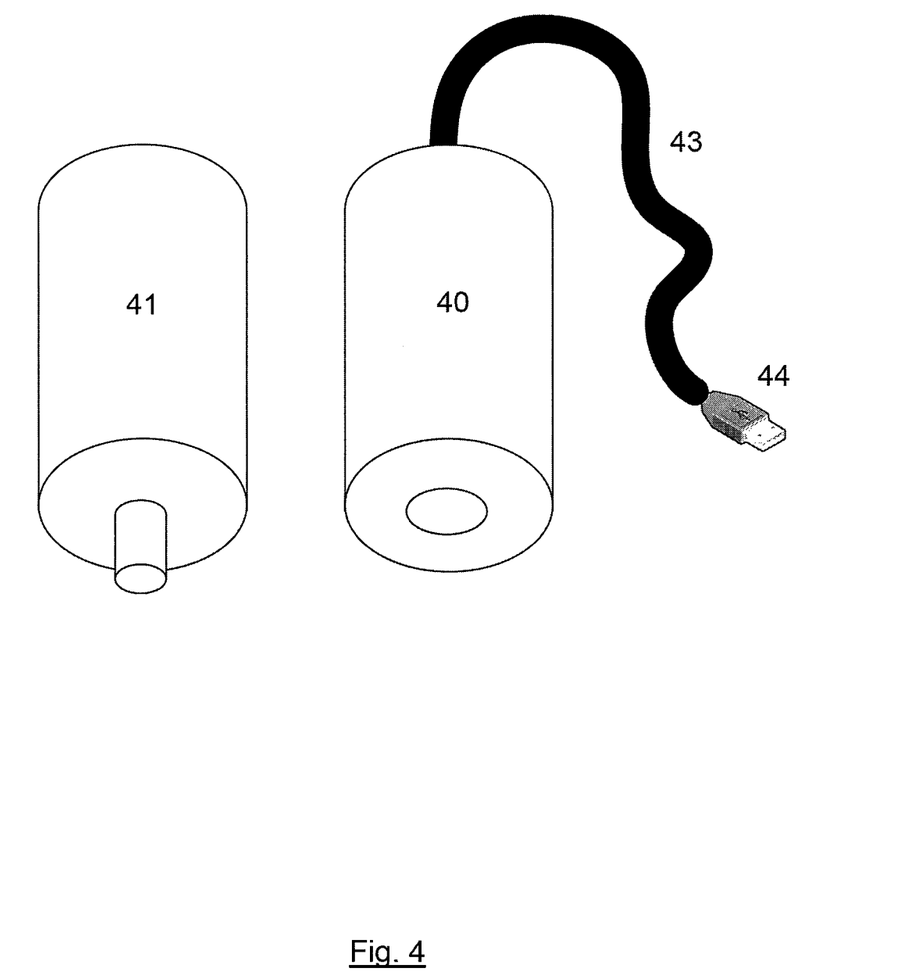
FIG. 4 shows a three dimensional illustration of the female inductive connector and the male inductive connector of FIG. 3, further comprising a Universal Serial Bus (USB) pigtail for connection to any conventional item of computer hardware.

FIG. 4 shows a three dimensional illustration of the female inductive connector 40 and the male inductive connector 41 of FIG. 3, further comprising a Universal Serial Bus (USB) pigtail 43, with USB type A connector 44 for connection to any conventional item of computer hardware.

Figure 5:
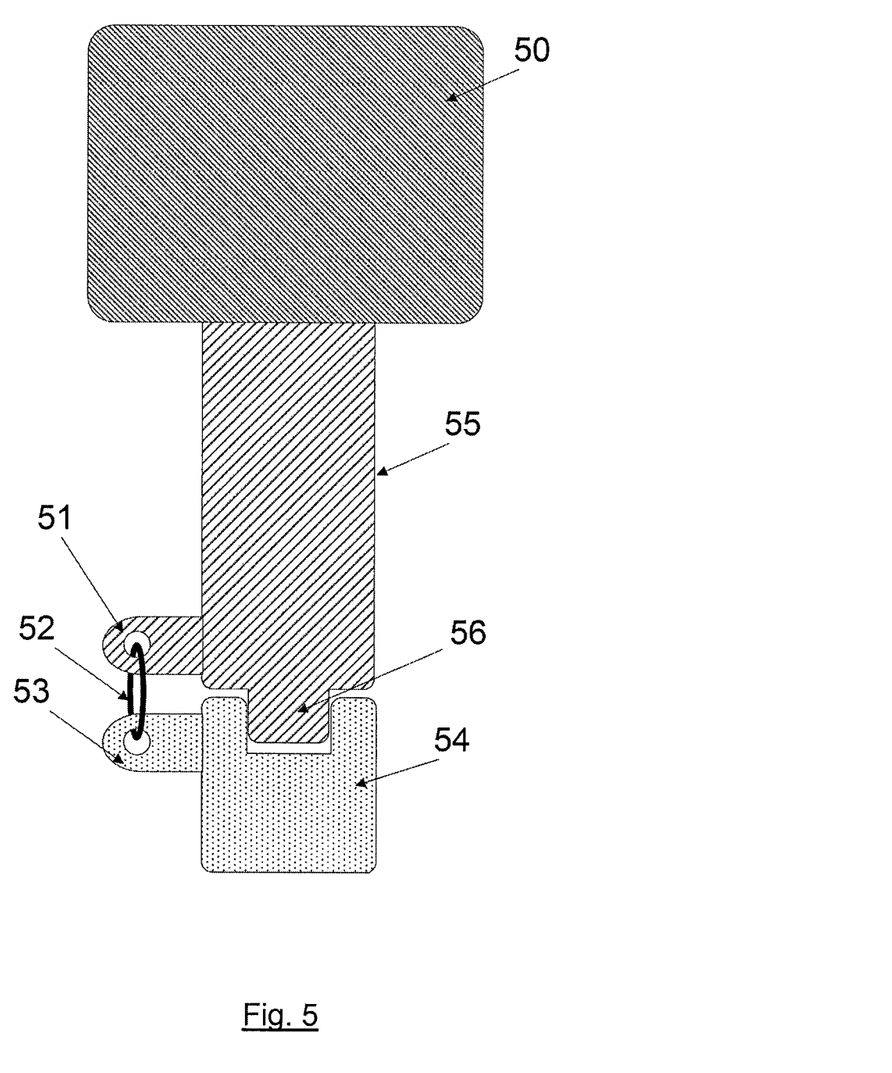
FIG. 5 shows a transportable pod comprising a male inductive connector, mated to a female inductive connector 54 of a docking station according to an embodiment of the present invention.

FIG. 5 shows a transportable pod 55 for underwater use comprising a male inductive connector 56, mated to a female conductive connector 54 of a docking station (not shown) with a captive connection 51, 52, 53 which may be released by a radio signal. Flange 51 supports wire link 52 which connects to flange 53 thereby retaining transportable pod 55 in contact with connector 55. At the moment when transportable pod 55 is to be release from connector 54 a current is passed through wire link 52 which is sufficient to fuse or break the wire resulting in release of the transportable pod from connector 54. The release command may be transmitted wirelessly by an RF signal or by an acoustic signal. The transportable pod 55 comprises a float 50 attached to an upwardly facing side thereof, so that transportable pod 55 is positively buoyant and will float to the surface of the water when the release mechanism is activated.

Figure 6:
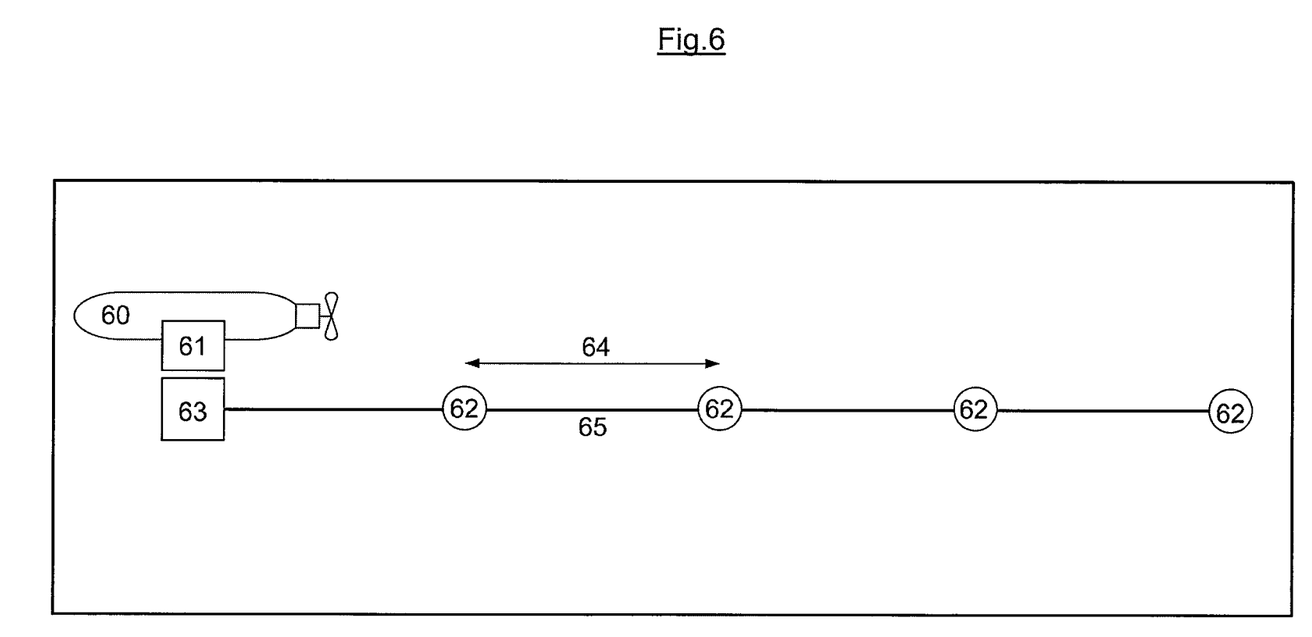
FIG. 6 shows a block diagram of an inductively coupled data and power transfer system comprising an array of sensors and a docking station which mates with a transportable pod according to an embodiment of the present invention.

FIG. 6 shows a block diagram of an inductively coupled data and power transfer system comprising an array of sensors wired to a docking station according to another embodiment of the present invention. The system of FIG. 6 comprises an array of sensor nodes 62 wired to a docking station 63 comprising an inductively coupled connector (not shown) that mates with a an inductively coupled connector (not shown) of a transportable pod 61 for collection by a UUV. Sensor nodes 62 may be seismic survey sensors that are spaced along and connected to data and power cable 65. Data and power cable 65 acts to control the spacing of sensors during deployment, supplies power from the transportable pod 61 via the inductively coupled connectors of the pod 61 and the docking station 63 to each sensor node 62 and similarly transfers data from each sensor node 62 to the transportable pod 61 via the inductively coupled connectors of the docking station 63 and pod 61. Data can also be transferred from a memory storage device of transportable pod 61, through host docking station 63 to each sensor 62 via the inductively coupled connectors of the docking station 63 and pod 61 and via data and power cable 65. UUV 60 periodically exchanges memory pod 61 with a fresh unit.

Those skilled in the art will understand that any form of data storage device or data storage medium other than those specified in the foregoing examples could be used to realize the present invention.

Moreover, those skilled in the art will understand that the term battery is used so as to encompass any form of portable energy source. Such an energy source might be a rechargeable battery, a long life battery, a capacitive device or a fuel cell.

The inductively coupled data and power transfer systems described herein are generally suited to systems and applications which are deployed in underwater environments. However, there is no reason why the system of the present invention would be limited to such underwater systems and applications.

Moreover, the above descriptions of the specific embodiments are made by way of example only and are not for the purposes of limitation. It will be obvious to a person skilled in the art that in order to achieve some or most of the advantages of the present invention, practical implementations may not necessarily be exactly as exemplified and may include variations within the scope of the present invention.

What is claimed is:

1. An underwater transportable pod for use in an underwater inductively coupled data and power transfer system said system comprising: a home docking station including an inductively coupled connector and a remote host docking station including an inductively coupled connector; the transportable pod including a battery, a solid state memory device, and an inductively coupled connector, said battery and said solid state memory device being electrically coupled to said inductively coupled connector via control electronic circuitry wherein, during use, electrical power is transferred via each of said inductively coupled connectors from said home docking station to said remote host docking station via the battery of the pod and data is transferred from said remote host docking station to said home docking station via said memory device of the pod, wherein electrical power is transferred in both directions between said battery and said remote docking station to said pod via said inductively coupled connector data is transferred in both directions between said docking station and said solid state memory device.

2. An underwater inductively coupled data and power transfer system according to claim 1 wherein said inductively coupled connectors are electrically insulated.

3. An underwater inductively coupled data and power transfer system according to claim 2 wherein said data is collected from a data collection device connected to said remote host docking station.

4. An underwater inductively coupled data and power transfer system according to claim 3 wherein data is transferred from said home docking station to said remote host docking station via said memory device of said pod.

5. An underwater inductively coupled data and power transfer system according to claim 4 wherein said battery of said pod is charged up at said home docking station.

6. An underwater inductively coupled data and power transfer system according to claim 5 wherein said pod further comprises a captive mechanical interface to facilitate connection of said pod to said docking stations.

7. An underwater transportable pod according to claim 1 wherein said control electronic circuitry comprises a DC to AC converter.

8. An underwater transportable pod according to claim 7 wherein said control electronic circuitry comprises an AC to DC converter.

9. An underwater transportable pod according to claim 8 wherein said control electronic circuitry comprises a modem operable to decode a data stream received from said docking station or to encode a data stream to be transferred to said docking station.

10. An underwater transportable pod according to claim 9 wherein said transportable pod further comprises a captive mechanical interface to facilitate connection of said pod to said docking station.

11. An underwater transportable pod according to claim 10 wherein the average density of said pod is less than that of water.

* * * * *